UNITED STATES PATENT OFFICE 2,666,727

ALKYL p-NITROPHENYL BENZENE-PHOSPHONATE

Arthur G. Jelinek, Wilmington, Del., assignor to E. I. du Pont de Nemours & Company, Wilmington, Del., a corporation of Delaware No Drawing. Application March 8, 1950,
Serial No. 148,500

7 Claims. (Cl. 167—30)

This invention relates to alkyl p-nitrophenyl benzenephosphonates, in which the alkyl group contains two thru four carbon atoms. More specifically, the invention relates to compositions and methods employing the above benzenephosphonates for the control of aphides.

The alkyl p-nitrophenyl benzenephosphonates of the invention, hereinafter referred to more briefly as the benzenephosphonates of the invention, are represented by the formula (1)
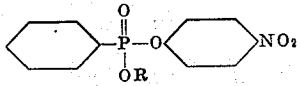

where R is ethyl, n-propyl, isopropyl, n-butyl, isobutyl, secondary butyl, or tertiary butyl.

The benzenephosphonates of the invention are suitably prepared, for example, by a two-step process. The process is illustrated below with particular reference to the preparation of the compound ethyl p-nitrophenyl benzenephosphonates. It will be understood, however, that by suitable choice of the reactants, the other benzenephosphonates of the invention are similarly prepared.

In the first step, sodium ethylate is reacted with benzenephophonyl dichloride to give chlorophenylethoxyphosphine oxide. In the second step, chlorophenylethoxyphosphine oxide is reacted with sodium p-nitrophenate to give the product. The reactions are:

(2)
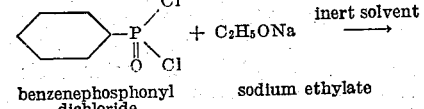

(3)
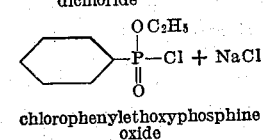

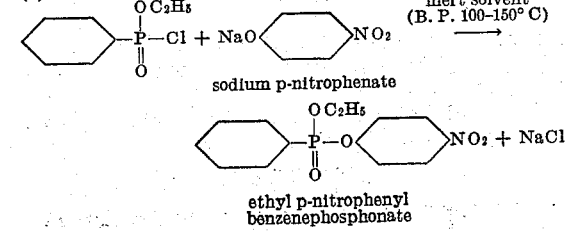

The first step of the reaction as illustrated in Equation 2 proceeds readily at room temperature. Instead of using sodium ethylate as a reactant, ethanol may be used. If ethanol is used instead of sodium ethylate, then a hydrogen chloride acceptor such as pyridine is also used in the reaction. The reaction of Equation 2 is suitably effected in the presence of an inert solvent such as benzene or chlorobenzene.

The reaction illustrated in Equation 3 is preferably carried out at an elevated temperature, say 100 to 150° C., in the presence of an inert solvent. Chlorobenzene is particularly suitable as a solvent because of its convenient boiling point since the reaction can be carried out at atmospheric pressure in the presence of chlorobenzene by refluxing at a temperature of about 130° C.

The benzenephosphonate of the invention is recovered from the reaction mass of Equation 3 by filtering off the insoluble sodium chloride and distilling off the solvent.

The benzenephosphonates of the invention prepared according to the steps illustrated above are oily liquids having a light yellow color and are obtained in good yield. While the product so obtained is not highly refined, analysis of it conforms closely to the calculated value. Further refinement of the product is difficult because it is not easily distilled nor is crystallization readily induced by cooling.

The benzenephosphonates of the invention are unusually effective in the control of aphides and are particularly well-suited for use in agriculture for applying to growing crops for the control of aphides.

The aphicidal compositions of the invention are prepared by admixing the benzenephosphonates of the invention with suitable insecticidal adjuvants to provide compositions in the form of solutions, dusts, water-dispersible powders and aqueous dispersions or emulsions.

By the term "insecticidal adjuvant," I mean a substance which is capable of presenting or aiding in the presentation of an insect toxicant to an insect. The term "adjuvant" is well established in the art where it is recognized that an active agent or toxicant is in itself of little practical utility for combatting insects unless it be presented in a form suitable for effecting intimate contact of the agent or its vapors, as the particular case may require, with the insect. Thus additional material or materials are employed in the formulation of an active agent to yield a suitable insecticidal composition, such materials being adjuvants.

Insecticidal adjuvants such as the dusts, solvents, wetting, dispersing and emulsifying agents set out in the United States Patent 2,426,417 may be employed in the preparation of the insecticidal compositions of the present invention. Other wetting, dispersing, and emulsifying agents, such as those listed in detail in Bulletin E-607 of the Bureau of Entomology and Plant Quarantine of the U. S. Dept. of Agriculture and such as those set out in an article by McCutcheon in Chemical Industries, November 1947, page 811 entitled "Synthetic Detergents," may also be used.

Preferably the compositions of the invention are in the form of "concentrates" suitable for dispersion in water to give aqueous spray compositions. A suitable emulsifiable oil concentrate is obtained, for example, by adding a dispersing or emulsifying agent to a benzenephosphonate of the invention. Preferably the dispersing or emulsifying agent is one which is soluble in the compound and ordinarily the agent will not comprise more than 10% by weight of the emulsifiable oil composition and the better adjuvant materials, the percentage will be 5% or less.

Less concentrated emulsifiable oil concentrates are prepared by dissolving a benzenephosphonate of the invention and a wetting, dispersing, and emulsifying agent in a suitable solvent. Care should be taken, however, in the selection of a solvent if the composition is to be applied to foliage since, as those skilled in the insecticide art know, many of the common solvents tend to injure plants.

Dust compositions of the invention contain a benzenephosphonate of the invention adsorbed on finely divided carriers or dusts such as talc, pyrophyllite, natural clays, diatomaceous earths, and other powdered diluents such as those set out in the aforementioned U. S. patent.

The dust compositions of the invention are prepared by mixing intimately the liquid benzenephosphonates of the invention with the powdered carrier. Alternatively, the toxic compound may be dissolved in a volatile solvent such as acetone and the solution thus obtained then mixed with the powdered carrier and the solvent subsequently removed from the composition by evaporation.

The maximum concentration of the toxicant in the dust composition or water-dispersible powder will, of course, vary with the adsorptivity of the particular powdered diluent used. For example, if fuller's earth is used, the dust may contain as much as about 40% of the liquid toxicant. Using a less adsorptive diluent such as pyrophyllite, however, it is necessary to reduce the content of the liquid toxicant appreciably in order to obtain a free-flowing powdered insecticidal composition.

Preferred water-dispersible powders of the invention contain in the order of about 35% by weight of a benzenephosphonate of the invention dispersed on a highly adsorbent inert powdered diluent such as fuller's earth or diatomaceous earth. Such water-dispersible powders also contain an effective amount of a dispersing or emulsifying agent. Bentonite is well-suited as a dispersing agent for this purpose.

In actual application of the compositions for aphid control, it is generally preferred that the toxicant be present in relatively low concentrations. For example, if application of the composition is to be made to vegetation or agricultural crops, the emulsifiable oil concentrate or water-dispersible powdered compositions described above are preferably dispersed in water to obtain aqueous suspensions or emulsions of suitable concentration.

In applying a compound of the invention for the control of aphides, the compound is, of course, applied in amounts sufficient to exert an aphicidal action. The amounts required, however, are extremely small because of the unusual effectiveness of the toxicants. In normal usage, however, such as in applications of the compositions to agricultural crops for the control of mites, the toxicant is suitably applied at a concentration of from 0.005 to 1.0%. More preferably if the treatment is made for the control of aphides by spraying an aqueous emulsion of an emulsifiable oil concentrate or an aqueous dispersion of a concentrated water-dispersible powder of the type previously described, the concentration of the toxicant in the spray composition is from about 0.005 to 0.05%.

The toxicant is applied either as a spray or a dust to the locus or area to be protected. Such application may be made directly upon the locus or area and the aphides thereon during the period of infestation or, alternatively, the application may be made in advance of an anticipated aphid infestation or otherwise applied so that the aphides will come into contact with the toxic residue and be killed.

The compositions of the invention may include fungicides such as zinc dimethyl dithiocarbamate, zinc ethylene bis-dithiocarbamate, and manganese ethylene bis-dithiocarbamate; insecticides such as DDT, 2,2-bis(paramethoxyphenyl)-1,1,1-trichloroethane (methoxychlor), and 1,2,4,-5,6,7,8,8 - octachloro - 4,7 - methane - 3a,4,7,7a - tetrahydroindane (chlordane); and other fungicides and insecticides such as those set out in U. S. Patent 2,426,417.

The invention is illustrated by the following examples:

EXAMPLE I

*Ethyl para-nitrophenyl benzenephosphonate*

Nine and two-tenths (9.2) grams absolute ethanol were added dropwise to a stirring solution of 39.0 grams benzenephosphonyl dichloride, 75 ml. chlorobenzene, and 15.8 grams pyridine while maintaining the temperature of the solution at 25–30° C. Stirring was continued for about two hours at room temperature after the addition of the alcohol to insure completeness of the reaction. The resulting slurry was then filtered through a fritted glass funnel to remove pyridine hydrochloride. The filtrate was placed in a reaction flask and to it was added 32.2 grams sodium p-nitrophenolate. Reaction took place almost immediately as evidenced by a slight rise in temperature. The reaction was then heated to reflux and stirred for about one-half hour, after which time the reaction was complete as evidenced by the disappearance of the reddish color of the phenolate. After cooling, the product was filtered to remove the fine suspension of sodium chloride which had formed. Chlorobenzene was removed from the product at 100° C. under reduced pressure (ca. 25 mm.) leaving a residue of liquid product, ethyl para-nitrophenyl benzenephosphonate, which weighed 27.3 g., $n_D^{27}=1.5678$.

*Anal.*—Calcd. for $C_{14}H_{14}NO_5P$: P, 10.1; N, 4.57. Found: P, 9.59, 9.48; N, 4.69, 4.65.

EXAMPLE II

*n-Propyl para-nitrophenylbenzenephosphonate*

6.01 grams of dry n-propyl alcohol was added dropwise over a period of 40 minutes to a solution of 19.5 grams of benzenephosphonyl dichloride and 10 cc. of pyridine in 50 cc. of benzene maintained at room temperature. The reaction was stirred for 1¼ hours and the pyridine hydrochloride removed by filtration. The solvent benzene was removed by distillation at reduced pressure leaving 15 grams of a residual oil. This residual oil was added to a suspension of 17.7 grams of sodium para-nitrophenate in 150 cc. benzene. The reaction mixture was refluxed overnight. The reaction mixture was then filtered and the solvent removed by distillation over reduced pressure. The product n-propyl para - nitrophenylbenzenephosphonate weighed 9.5 grams $n_D^{26}=1.5629$.

The corresponding isopropyl and n-butyl esters of the para-nitrophenylbenzenephosphonate were prepared in a manner analogous to that described above. Both were oils.

Isopropyl para - nitrophenylbenzenephosphonate, $n_D^{26}=1.5595$.

*Anal.*—Calcd. for $C_{15}H_{16}NO_5P$: C, 56.07; H, 5.02. Found: C, 55.89; H, 5.52.

n - Butyl - para-nitrophenylbenzenephosphonate, $n_D^{26}=1.5680$.

*Anal.*—Calcd. for $C_{16}H_{18}O_5PN$: C, 57.30; H, 5.41. Found: C, 55.38; H, 5.47.

EXAMPLE III

*Water-dispersible aphicidal powder*

A water-dispersible aphicidal powder is obtained by admixing ethyl p-nitrophenyl benzenephosphonate, prepared as in Example I with finely divided fuller's earth and finely divided bentonite in the following proportions by weight;

|  | Per cent |
|---|---|
| Ethyl p-nitrophenyl benzenephosphonate | 35 |
| Bentonite | 5 |
| Fuller's earth | 60 |

The water-dispersible powdered composition of this example is free-flowing and is easily dispersed in water to give a relatively stable suspension in an aqueous spray composition. An excellent spray composition suitable for application to apple trees for the control of aphides is obtained by the dispersion of the composition of this example in water in the proportions of 12 oz. of the composition per 100 gallons of water.

EXAMPLE IV

*Aphicidal emulsifiable oil concentrate*

Tertiary butyl p-nitrophenyl benzenephosphonate is admixed with 5% by weight of a proprietary wetting, dispersing, and emulsifying agent having as its effective ingredient diethylcyclohexylamine dodecyl sulfate.

The emulsifiable oil concentrate of this example is readily dispersible in water to obtain aqueous spray compositions which are highly effective in the application to growing crops for the control of aphides.

A spray composition suitable for application to fruit trees for the control of aphides is obtained by the dispersion of the composition of this example in water in the proportions of 4 oz. of the composition per 100 gallons of water.

EXAMPLE V

*Aphicidal dust composition*

An aphicidal dust is prepared by admixing the 35% isopropyl p-nitrophenyl benzenephosphonate composition prepared according to Example IV, with pyrophyllite in the proportions of about 16 parts by weight of pyrophyllite for each part by weight of the 35% benzenephosphonate composition.

The dust composition of this example is free-flowing and is easily broadcast over an area to be protected from infestation by aphides.

I claim:
1. A method for the control of aphides which comprises applying to a locus to be protected in amount sufficient to exert an aphicidal action, an alkyl p-nitrophenyl benzenephosphonate in which the alkyl group contains from two thru four carbon atoms.
2. An alkyl p-nitrophenyl benzenephosphonate in which the alkyl group contains from two thru four carbon atoms.
3. n-Propyl p-nitrophenyl benzenephosphonate.
4. Isopropyl p-nitrophenyl benzenephosphonate.
5. Ethyl p-nitrophenyl benzenephosphonate.
6. n-Butyl p-nitrophenyl benzenephosphonate.
7. Isobutyl p-nitrophenyl benzenephosphonate.

ARTHUR G. JELINEK.

References Cited in the file of this patent

UNITED STATES PATENTS

| Number | Name | Date |
|---|---|---|
| 2,503,390 | Jelinek | Apr. 11, 1950 |

OTHER REFERENCES

Martin et al., B. I. O. S. Report No. 1095, pages 21 and 22, released November 7, 1947.